(12) United States Patent
Hottinen

(10) Patent No.: US 6,282,425 B1
(45) Date of Patent: Aug. 28, 2001

(54) CELLULAR RADIO SYSTEM WITH IMPROVED CHARACTERISTICS IN BORDER AREAS

(75) Inventor: Ari Hottinen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/308,961

(22) PCT Filed: Dec. 4, 1997

(86) PCT No.: PCT/FI97/00757

§ 371 Date: Aug. 13, 1999

§ 102(e) Date: Aug. 13, 1999

(87) PCT Pub. No.: WO98/25427

PCT Pub. Date: Jun. 11, 1998

(30) Foreign Application Priority Data

Dec. 4, 1996 (FI) .......................................... 964855

(51) Int. Cl.⁷ .............................. H04B 7/15; H04B 3/36; H04B 7/14; H04Q 7/20
(52) U.S. Cl. .................... 455/453; 455/422; 455/11.1; 455/7; 455/443
(58) Field of Search .................... 455/11.1, 422, 455/436, 517, 62, 450, 458, 453, 503, 522, 69, 208, 207, 7, FOR 209, FOR 206

(56) References Cited

U.S. PATENT DOCUMENTS

| | | | |
|---|---|---|---|
| 4,670,899 | * | 6/1987 | Brody ...................................... 379/60 |
| 4,974,256 | * | 11/1990 | Cyr ......................................... 379/113 |
| 5,428,817 | | 6/1995 | Yahagi . |
| 5,442,807 | * | 8/1995 | Takayama ............................ 455/33.1 |
| 5,499,395 | * | 3/1996 | Doi ....................................... 455/33.1 |
| 5,809,430 | * | 9/1998 | D'Amico .............................. 455/525 |
| 5,896,573 | * | 4/1999 | Yang ..................................... 455/453 |
| 5,930,684 | * | 7/1999 | Keskitalo ............................... 455/69 |
| 6,112,104 | * | 8/2000 | Saario ................................... 455/561 |

FOREIGN PATENT DOCUMENTS

| | | |
|---|---|---|
| 0 566 551 | 10/1993 | (EP) . |
| 96-08119 | 3/1996 | (WO) . |
| 96/38014 | 11/1996 | (WO) . |

* cited by examiner

Primary Examiner—Daniel Hunter
Assistant Examiner—Meless Zewdu
(74) Attorney, Agent, or Firm—Pillsbury Winthrop LLP

(57) ABSTRACT

The present invention relates to a cellular radio system which includes base stations (BTS1, BTS2) comprising transceiver means and antenna means (ANT1, ANT2) for creating a radio connection to mobile stations (MS). In order to improve audibility within the border areas between base station coverage areas, the system comprises an antenna means ANT), which is common at least to the first and the second base station (BTS1, BTS2) and which comprises means for further transmitting over the radio path signals received from the first and the second base station (BTS1, BTS2) and, correspondingly, means for feeding the signals received over the radio path to at least the first and the second base station (BTS1, BTS2).

7 Claims, 3 Drawing Sheets

CELLULAR RADIO SYSTEM WITH IMPROVED CHARACTERISTICS IN BORDER AREAS

This application is the national phase of international application PCT/FI97/00757 filed Dec. 4, 1997 which designated the U.S.

BACKGROUND OF THE INVENTION

This invention relates to a cellular radio system and particularly to efficient utilization of its capacity.

In prior art cellular radio system base stations are arranged in such a way that the geographical areas they cover usually overlap to some extent. Therefore mobile stations located in the border areas of the coverage areas of the base stations usually can select among several alternative base stations the one offering the best audibility. For practical reasons, however, the aim is to arrange adjacent base stations in such a way that their overlapping coverage area is as small as possible. This allows a geographical area of a maximum size to be covered with a minimum number of base stations.

The overlapping coverage area of adjacent base stations being as small as possible has, however, caused problems. For instance, in the border areas of the base station coverage areas there can be shadow regions where the audibility of the system is poor. A further problem is that the traffic capacity of one of the two adjacent base stations can be fully reserved, while the other can still have plenty of free traffic capacity available. In this case a mobile station trying to contact the fully reserved base station is not able to establish a telecommunication connection, unless it happens to be located in the overlapping (as small as possible) coverage area of the base stations where both base stations are audible. In order to enable the traffic load to be more efficiently divided between the base stations, it would therefore be advantageous that the overlapping coverage area of adjacent base stations would be as large as possible, whereby as many mobile stations as possible could select the base station among a plural number of base stations audible at the point concerned. This would, however, significantly increase the price of the system because more base stations would need to be built within an area of a specific size.

SUMMARY OF THE INVENTION

An object of the present invention is to solve the above mentioned problem and to provide a cellular radio system with a better audibility within the border areas between the base station coverage areas, which allows the overlapping coverage areas of adjacent base stations to be made larger, without causing a significant increase in the price of the system and which allows more efficient utilization of the traffic capacity available to the system. This object is achieved with a cellular radio system of the invention, said system including base stations which comprise transceiver means and antenna means for creating a radio connection to mobile stations located within their radio coverage area and an antenna means, which is operationally connected to at least a first and a second base station and which comprises means for further transmitting over the radio path signals received at least from the first and the second base station and, correspondingly, means for feeding signals received over the radio path to at least the first and the second base station. The cellular radio system of the invention is characterized in that, in order to adjust the load on said base stations, the system includes a control means for making said common antenna means to further transmit, at mutually different power levels, over the radio path the signals fed by the first and the second base station.

The invention is based on the idea that when a common antenna means is arranged for the base stations, in addition to separate antennas of their own, and when the common antenna means is equipped in such a way that both the base stations can use it at the same time for communicating with mobile stations located within the area, then the audibility of the system is significantly improved, because any shadow areas can then be eliminated more efficiently than before, without causing the need to increase the number of base stations. In a system like this the load on the base stations can be adjusted via the control unit in such a way that the control unit makes the antenna means to further transmit, at mutually different power levels, the signals received from the first and the second base station. This allows stepless adjustment of the base station coverage areas, allowing at the same time the load on the radio cells maintained by adjacent base stations to be adjusted optimally.

Thus the most significant advantages the invention provides are that it improves audibility within the border areas of the base station coverage areas, without significant additional costs, and at the same time it allows stepless levelling of the traffic load on adjacent base stations, performed by adjusting their coverage area, because a larger overlapping base station coverage area will include more mobile stations that can use either one of the adjacent base stations for their connections. In addition, due to larger base station coverage areas the number of handovers is reduced and they can be performed more smoothly than before, because at the moment of the handover the mobile station has already moved deep into the coverage area of the "new" base station, whereby the audibility between the new base station and the mobile station is better from the very beginning (after handover).

In a preferred embodiment of a cellular radio system of the invention the control means of the system can, e.g. on the basis of the prevailing traffic situation, connect the antenna means for the use of both the first and the second base station simultaneously or, alternatively, only for the first or the second base station. This embodiment of the invention allows more efficient utilization of the traffic capacity available. In other words, if for instance the traffic capacity of the first base station is fully reserved at a particular moment, but the second base station at the same time still has plenty of free traffic capacity, the control unit can bring the common antenna means to a state where it is only available to the second base station. This reduces the coverage area of the first base station and causes some of the mobile stations located within the overlapping coverage area of the first and the second base station to perform handover to the area of the second base station, which naturally releases traffic capacity at the first base station.

In the above mentioned embodiment the control unit is preferably arranged to control the antenna means so that it will maintain the traffic load between the base stations as even as possible. The common antenna means is thus made unavailable to one of the base stations already long before the traffic capacity of the base station concerned is fully in use.

The control means controlling the common antenna element can be the base station controller of one of the base stations. Alternatively, said control means can consist of an independent control unit arranged in connection with the common antenna means, said control unit controlling the common antenna means only on the basis of the data transmitted by the first and the second base station. Due to this it is possible not to burden the higher levels of the system, such as the base station controller or the mobile services switching centre, with the control of the common antenna means.

Preferred embodiments of the cellular radio system of the invention are described in the attached dependent claims 2–7.

BRIEF DESCRIPTION OF THE DRAWINGS

The invention will be described, by way of example in more detail in connection with some preferred embodiments of a cellular radio system of the invention, with reference to the attached drawings in which.

DETAILED DESCRIPTION OF THE INVENTION

Figure 1:
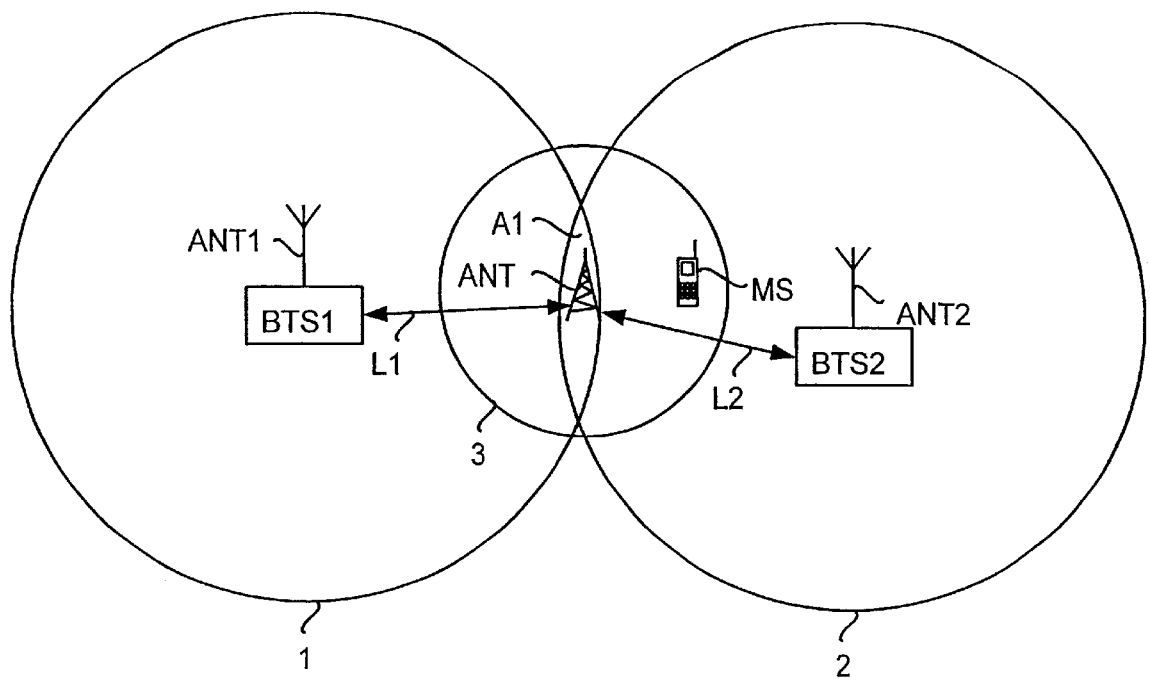
FIG. 1 is a block diagram illustrating a first preferred embodiment of a cellular radio system of the invention.

FIG. 1 illustrates a first preferred embodiment of a cellular radio system of the invention. The cellular radio system shown in FIG. 1 can be any cellular radio system known per se, e.g. a time division cellular radio system divided in channels according to a Time Division Multiple Access (TDMA) principle, such as a Groupe Spéciale Mobile (GSM) or a Digital Cellular System (DCS). However, in the following it is assumed, by way of example, that the system in question is a spread spectrum system such as a Code Division Multiple Access (CDMA) system.

The coverage areas covered by antenna means ANT1 and ANT2 of base stations BTS1 and BTS2 shown in FIG. 1 are illustrated by circles 1 and 2. Base stations BTS1 and BTS2 have been allocated individual logical channels of their own (e.g. different time slots in TDMA systems, different frequencies in FDMA systems or different spreading codes in CDMA systems), which they use in their connections. In order to ensure that no shadow regions are left within the overlapping coverage area A1 of base stations BTS1 and BTS2, a common antenna ANT is arranged, in accordance with the invention, between the base stations, the coverage area of said antenna being illustrated with circle 3. The common antenna ANT comprises means for further transmitting over the radio path signals received via data transmission links L1 and L2 from base stations BTS1 and BTS2. Correspondingly, the common antenna ANT comprises means for feeding signals received over the radio path both to base station BTS1 and base station BTS2 via data transmission links L1 and L2.

In the CDMA system in FIG. 1 each base station is arranged to transmit an individual pilot signal of its own on the basis of which mobile station MS distinguishes the base stations from each other and also selects the base station that it will be using for its connections at a particular moment. In order to transmit pilot signals, a certain number of codes are reserved in the system in advance, one code being given for use to each base station. When the mobile station detects that the pilot signal it uses degrades below a predetermined level, it selects another base station the pilot signal of which is received better. In FIG. 1 the common antenna ANT is arranged to further transmit over the radio path the pilot signals of both base station BTS1 and base station BTS2. The pilot signal of base stations BTS1 and BTS2 in FIG. 1 is thus transmitted from two different locations. The pilot signals of base stations BTS1 and BTS2 received by mobile station MS shown in FIG. 1 are thus substantially equally strong, said mobile station being assumed to be located at an equal distance from the common antenna ANT and antenna ANT2 of base station BTS2. It can therefore freely decide whether to use base station BTS1 or BTS2.

Figure 2:
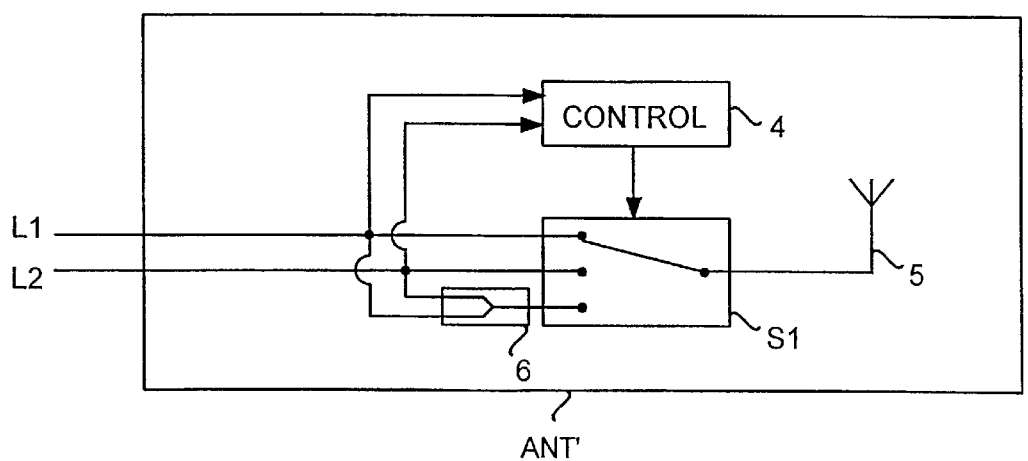
FIG. 2 illustrates a preferred embodiment of a common antenna.

FIG. 2 illustrates a preferred embodiment of a common antenna, which is suitable for use e.g. within the system shown in FIG. 1. In the embodiment of FIG. 2 antenna ANT' comprises switching means S1 and control unit 4, which can be used to guide antenna ANT' between three different alternative states.

FIG. 2 only shows parts needed for antenna control, in addition to which antenna ANT' can also include other parts, such as transceiver units or amplifiers. What parts are needed in the antenna primarily depends on how data transmission between the base stations and the common antenna is arranged. Said data transmission can be performed e.g. with radio frequency signals, in which case the received signals are amplified, branched and fed e.g. via cables to receivers at the base stations. In this case transmitted signals are correspondingly relayed at transmission frequency from the base stations, the antenna means including amplifiers for amplifying these signals and for feeding them to an antenna element. Alternatively, the common antenna can include complete transmitters and receivers, in which case data transmission between the base stations and the common antenna can be performed in a binary form, using a data transmission connection known per se. This way it is possible to have the common antenna means to send the signal concerned only to one base station, i.e. specifically to the base station the signal is destined to. This reduces the capacity needed in the data transmission connections between the base stations and the common antenna means. In addition, it enables avoiding losses that occur when signals of a transmission frequency are transferred via cables from one location to another.

In the case shown in FIG. 2 antenna ANT' is in a first state, which means that it is only available to base station BTS1 (shown in FIG. 1), i.e. only signals transmitted via data transmission link L1 are transmitted to antenna element 5 and, correspondingly, the signals received with antenna element 5 are fed forward only via data transmission link L1. In order to bring antenna ANT' to a second state, control unit 4 guides switching means S1 to a second position, whereby only signals transmitted via data transmission link L2 are transmitted to antenna element 5 and, correspondingly, the signals received with antenna element 5 are fed forward only via data transmission link L2. In order to bring antenna ANT' further to a third state, control unit 4 guides switching means S1 to a third position, whereby both data transmission link L1 and data transmission link L2 can be connected to antenna element 5 via connector and branching means 6. In this case antenna ANT' is available to both the first and the second base station.

In the embodiment shown in FIG. 2 control unit 4 is arranged in connection with the common antenna ANT' where it receives from base stations BTS1 and BTS2 data on their traffic loads. On the basis of these data control unit 4 guides switching means S1 in such a way that the traffic load of base stations BTS1 and BTS2 is made as even as possible. Thus the control of the common antenna ANT' does not increase the load on the higher levels of the system (such as the base station controller or the mobile services switching centre). In addition, the common antenna ANT' can also easily be arranged in connection with two base stations controlled by separate base station controllers. Unlike in the case shown in FIG. 2, the control of the common antenna can naturally also be arranged from the base station controller whereby a control unit like the one in FIG. 2 is not needed in the common antenna.

Figure 3:
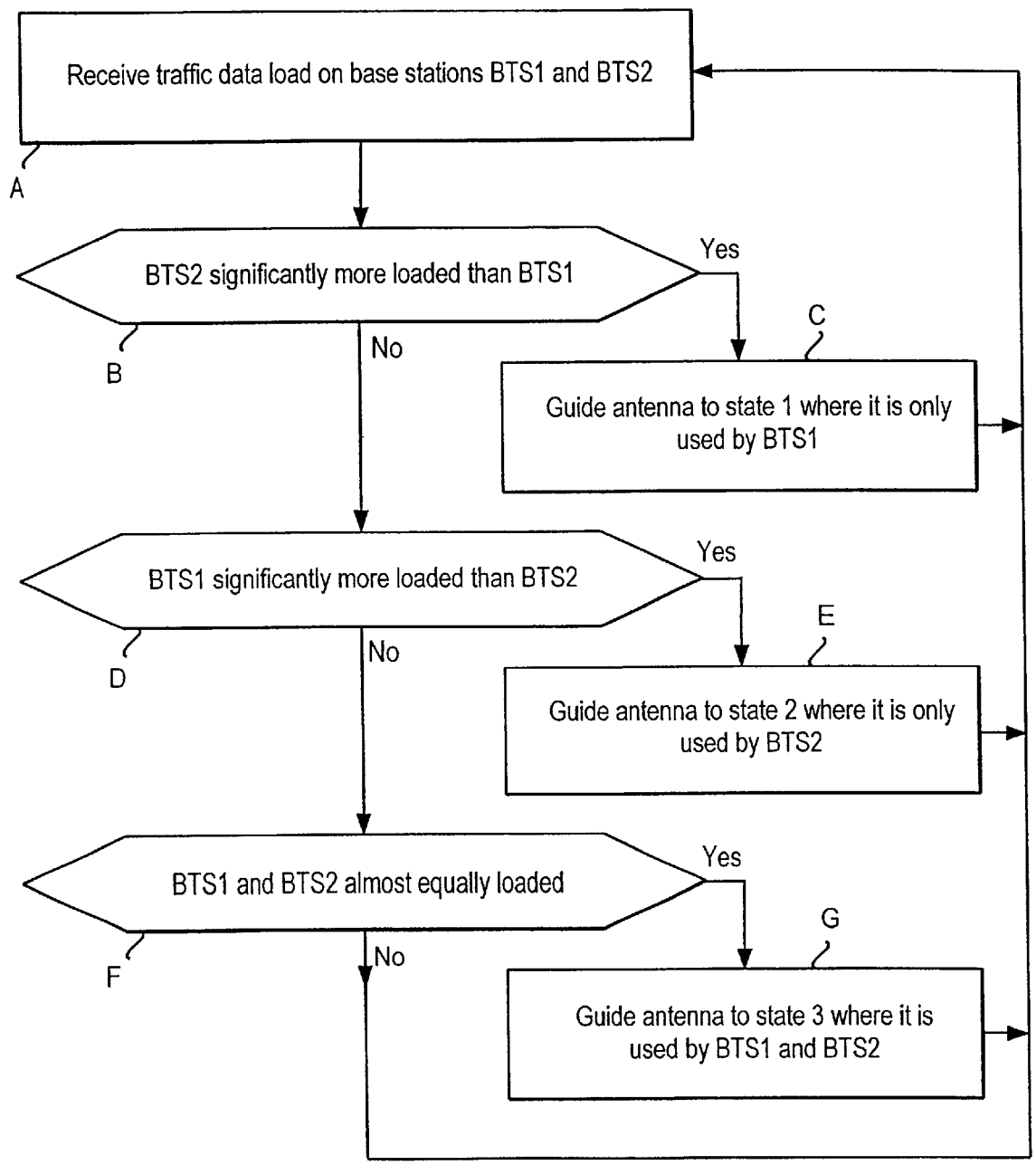
FIG. 3 is a flow diagram illustrating the control of the common antenna in FIG. 2.

FIG. 3 is a flow diagram illustrating the control of the common antenna ANT' shown in FIG. 2. In the initial situation in block A it is assumed that the common antenna means is used by both the base stations. In this case the control unit receives data from base stations BTS1 and BTS2 on their traffic situation.

In case base station BTS2 is significantly more loaded than base station BTS1, the control unit guides in block C the common antenna ANT' to a state where it is only available to base station BTS1. Thus the coverage area of base station BTS2 in the area between the base stations increases and, correspondingly, the coverage area of base station BTS1 in the area between the base stations is reduced. It can therefore be assumed that at least some of the mobile stations located within the area between the base stations will change over to use base station BST1 instead of base station BTS2, which levels the load on the base stations.

But if base station BTS1 is significantly more loaded than base station BTS2, in block E the control unit guides the common antenna ANT' to a state where it is only available to base station BTS2, which will probably level the load on the base stations. In FIG. 1, mobile station MS, which is assumed to be connected to base station BTS1 via the common antenna, then detects that the pilot signal it receives from base station BTS2 is significantly stronger than the pilot signal from base station BTS1 and it performs a handover to base station BTS2.

But if the load on base stations BTS1 and BTS2 is approximately equal, in block G the control unit guides the common antenna to a state where it is available to both base station BTS1 and base station BTS2.

Figure 4:
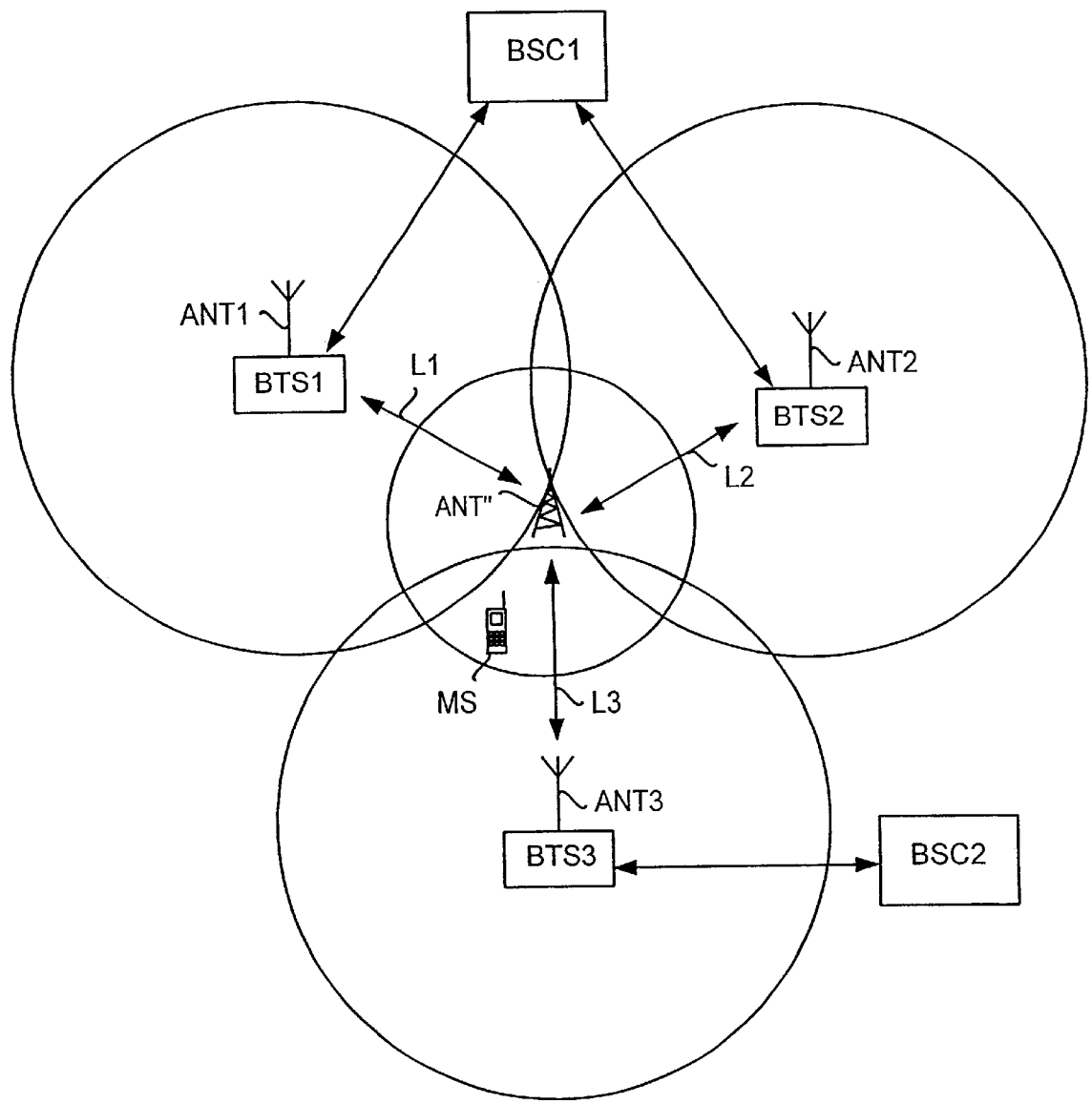
FIG. 4 is a block diagram illustrating a second preferred embodiment of the cellular radio system of the invention.

FIG. 4 is a block diagram illustrating a second preferred embodiment of the cellular radio system of the invention. The embodiment in FIG. 4 is very similar to that of FIG. 1 from which it differs in that antenna ANT'' in FIG. 4 is common to three base stations BTS1, BTS2 and BTS3 of which base stations BTS1 and BTS2 are controlled by a common base station controller BSC1, whereas base station BTS3 is controlled by a second base station controller BSC2.

The common antenna ANT'' shown in FIG. 4 preferably comprises a control unit corresponding to the description given in connection with FIG. 2, which allows using it for levelling the traffic load between different base stations BTS1, BTS2 and BTS3, without requiring control from base station controllers BSC1, BSC2 or from a mobile switching centre. Unlike in FIG. 2, the control unit can, however, be of such type that it adjusts the load between the base stations by steplessly adjusting of the transmission power of signals received from the different base stations in such a way that the signals of the base station with the smallest load are transmitted with the highest power. In other words, the common antenna means ANT'' transmits the signals of different base stations BTS1, BTS2 and BTS3 at mutually different power levels. The power levels are determined by the control unit on the basis of the traffic load on the different base stations.

It is to be understood that the above description and the related drawings are only meant to illustrate the present invention. Therefore e.g. two base stations can have several common antenna means, although the above case described by way of example concerns base stations with a single common antenna means. For persons skilled in the art it will be apparent that the invention can also be varied and modified in different ways without deviating from the scope and spirit of the invention described in the attached claims.

What is claimed is:

1. A cellular radio system comprising:
   a plurality of base stations, each including transceiver means and base station antenna means for establishing a radio connection to at least one mobile station located within its respective radio coverage area;
   common antenna means operationally connected to at least one of a first and a second base station of the plurality of the base stations, the common antenna means including means for (i) receiving signals transmitted from the at least one base station and further transmitting received base station signals to the at least one mobile station and (ii) receiving signals transmitted from the at least one mobile station and further transmitting received mobile station signals to the at least one base station;
   wherein the signals are further transmitted to adjust a traffic load on the at least one base station; and
   control means electrically coupled with the common antenna means, the control means being for adjustiig respective power levels associated with the signals, the respective power levels being adjusted to different values.

2. The cellular radio system according to claim 1, wherein said common antenna means is spaced apart from the at least one base station.

3. The cellular radio system according to claim 1, wherein said control means is arranged to guide said common antenna means between a first state, a second state, and a third state;
   wherein in the first state the common antenna means is operationally connected only to the first base station,
   wherein in the second state the common antenna means is operationally connected only to the second base station, and
   wherein in the third state the common antenna means is operationally connected to at least the first and the second base stations.

4. The cellular radio system according to claim 3, wherein said control means is responsive to the traffic load on at least the first and the second base stations, the control means being (i) arranged to guide the common antenna means to said first state when the traffic load on at least the second base station is higher than the traffic load on the first base station by a first predetermined amount and (ii) correspondingly arranged to guide the common antenna means to said second state when the traffic load on the first base station is higher than the traffic load on the at least second base station by a second predetermined amount.

5. The cellular radio system according to claim 1, wherein a base station controller of at least one of the first and second base stations forms said control means.

6. The cellular radio system according to claim 3, wherein the control means comprises a separate control unit cooperatively arranged with the common antenna means.

7. The cellular radio system according to claim 1, wherein said system is a spread spectrum system, preferably a code division multiple access system.

* * * * *